(12) United States Patent
Hasegawa et al.

(10) Patent No.: US 7,948,219 B2
(45) Date of Patent: May 24, 2011

(54) CONTROL CIRCUIT OF SYNCHRONOUS RECTIFICATION TYPE POWER SUPPLY UNIT, SYNCHRONOUS RECTIFICATION TYPE POWER SUPPLY UNIT AND CONTROL METHOD THEREOF

(75) Inventors: Morihito Hasegawa, Kasugai (JP); Hidekiyo Ozawa, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 565 days.

(21) Appl. No.: 11/902,706

(22) Filed: Sep. 25, 2007

(65) Prior Publication Data
US 2008/0079408 A1    Apr. 3, 2008

(30) Foreign Application Priority Data
Sep. 28, 2006  (JP) .................................. 2006-263987

(51) Int. Cl.
*G05F 1/618* (2006.01)
(52) U.S. Cl. ........................ 323/223; 323/284; 363/127
(58) Field of Classification Search .................. 323/223, 323/282–283, 284, 285; 363/127
See application file for complete search history.

(56) References Cited

U.S. PATENT DOCUMENTS 6,269,012 B1    7/2001  Kusakabe et al.
6,958,592 B2 *  10/2005 Chapuis ........................ 323/246
7,193,401 B1 *  3/2007  Hasegawa ..................... 323/283
7,250,745 B2    7/2007  Yasukouchi et al.
7,268,448 B2 *  9/2007  Hasegawa ...................... 307/31

FOREIGN PATENT DOCUMENTS

| JP | 2004-135415 A | 4/2004 |
| KR | 10-2005-0123034 A | 12/2005 |
| TW | 478239 | 3/2002 |

OTHER PUBLICATIONS

Taiwan Intellectual Property Office: Search Report dated Jan. 4, 2011 for corresponding TW Patent Application No. 096134216, with English-language translation.

* cited by examiner

*Primary Examiner* — Harry Behm
(74) *Attorney, Agent, or Firm* — Fujitsu Patent Center

(57) ABSTRACT

The control circuit comprises: a detecting portion COMP1 for detecting a status transition of a first signal FR at the connecting point P which changes at a constant cycle corresponding to current flowing through the antiparallel diode D when the main switch device FET is turned OFF; and a phase difference adjusting portion 30, 40 for adjusting the phase difference by adjusting the output timing of the second signal FP corresponding to a phase difference between the phase of the first signal FR detected by the detecting portion COMP1 and the phase of the second signal FP generated based on the first signal of one cycle before and the rectification switch device FET2 is turned ON corresponding to the second signal FP whose output timing is adjusted by the phase difference adjusting portion 30, 40.

17 Claims, 5 Drawing Sheets

DIAGRAM OF CIRCUIT STRUCTURE OF SYNCHRONOUS RECTIFICATION TYPE POWER SUPPLY UNIT ACCORDING TO EMBODIMENT OF THE INVENTION

FIG. 1 DIAGRAM OF CIRCUIT STRUCTURE OF SYNCHRONOUS RECTIFICATION TYPE POWER SUPPLY UNIT ACCORDING TO EMBODIMENT OF THE INVENTION

FIG. 2 DIAGRAM OF CIRCUIT STRUCTURE OF PHASE DIFFERENCE DETECTING CIRCUIT

FIG. 3 DIAGRAM OF CIRCUIT STRUCTURE OF DELAY CIRCUIT

TIMING CHART SHOWING OPERATION OF PHASE DIFFERENCE DETECTING CIRCUIT

DIAGRAM OF CIRCUIT STRUCTURE OF CONVENTIONAL SYNCHRONOUS RECTIFICATION TYPE POWER SUPPLY UNIT

CONTROL CIRCUIT OF SYNCHRONOUS RECTIFICATION TYPE POWER SUPPLY UNIT, SYNCHRONOUS RECTIFICATION TYPE POWER SUPPLY UNIT AND CONTROL METHOD THEREOF

CROSS-REFERENCE TO RELATED APPLICATIONS

This application is based upon and claims the benefit of priority from the prior Japanese Patent Application No. 2006-263987 filed on Sep. 28, 2006, the entire contents of which are incorporated herein by reference.

BACKGROUND

1. Field

The embodiments discussed herein are directed to a control circuit of a synchronous rectification type power supply unit, a synchronous rectification type power supply unit and a control method thereof.

2. Description of the Related Art

There has been known a synchronous rectification type power supply unit provided with a main switch device and a rectification switch device as disclosed in, for example, Japanese Unexamined Patent Publication No. 2004-135415. In this synchronous rectification type power supply unit, the main switch device connected to a DC power supply is turned ON and OFF cyclically so as to accumulate electric power in an energy accumulating inductance device and a synchronous rectification inductance device connected parallel to the energy accumulating inductance device in an ON period of the main switch device and then the rectification switch device is turned off. Further in this synchronous rectification type power supply unit, when the main switch device is kept OFF, the rectification switch device is turned ON so as to supply electric power accumulated in the energy accumulating inductance device to a load unit.

Before discharge of accumulated electric power of the energy accumulating inductance device is completed, the aforementioned synchronous rectification type power supply unit completes the discharge of the accumulated electric power of the synchronous rectification inductance device, detects the discharge of the accumulated electric power and turns OFF the rectification switch device before the main switch device is turned ON. Consequently, the main switch device and the rectification switch device are never turned ON at the same time, thereby preventing the rectification switch device and the like from being destroyed due to a short-circuit current which flows if both the switches are turned ON.

A synchronous rectification type power supply unit 100 shown in FIG. 5 comprises a main switch device FET1, a rectification switch device FET2 and a comparator COMP 101. In this synchronous rectification type power supply unit 100, the comparator COMP 101 compares drain voltage of the rectification switch device FET2 with grounding voltage. The comparator COMP 101 outputs a high level signal when the grounding voltage is higher than drain voltage of the rectification switch device FET2. The high level signal is inputted to a gate of the rectification switch device FET2 through an output terminal (DL1) of a control circuit 105. Consequently, the rectification switch device FET2 is turned ON.

On the other hand, the comparator COMP 101 outputs a low level signal when the drain voltage of the rectification switch device FET2 is higher than the grounding voltage. The low level signal is inputted to the gate of the rectification switch device FET2 through the aforementioned output terminal (DL1). Consequently, the rectification switch device FET2 is turned OFF.

SUMMARY

It is an aspect of the embodiments discussed herein to provide a control circuit of a synchronous rectification type power supply unit including a coil being coupled to a connecting point between a main switch device and a rectification switch device having an antiparallel diode wherein the main switch device and the rectification switch device are turned ON and OFF alternately at a constant cycle, a detecting portion detecting a status transition of a first signal at the connecting point changing at a constant cycle corresponding to current flowing through the antiparallel diode when the main switch device is turned OFF, and a phase difference adjusting portion adjusting the phase difference by adjusting the output timing of the second signal corresponding to a phase difference between the phase of the first signal detected by the detecting portion and the phase of the second signal generated based on the first signal of one cycle before, wherein the rectification switch device is turned ON corresponding to the second signal whose output timing is adjusted by the phase difference adjusting portion.

The above and further novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The synchronous rectification type power supply unit described in the related art has been reduced in size because of improvement of the switch device and the like and employment of high frequency as the switching frequency. In the above-mentioned synchronous rectification type power supply unit 100, as the employment of high frequency as the switching frequency is accelerated, the switching cycle can be shortened so that the ON and OFF operation of the main switch device FET1 and the rectification switch device FET2 can be carried out rapidly.

However, in the aforementioned comparator COMP101, delay occurs in time period from the time when the ground voltage is compared with a drain voltage of the rectification switch device FET2 to the time when a high level signal or a low level signal is outputted. Particularly, if the switching cycle is shortened like the synchronous rectification type power supply unit in recent years, the ratio of the time delay in the switching cycle increases, thereby providing a possibility that time delay may impose an obstacle upon operation of turning the switch device ON and OFF rapidly.

Figure 1:
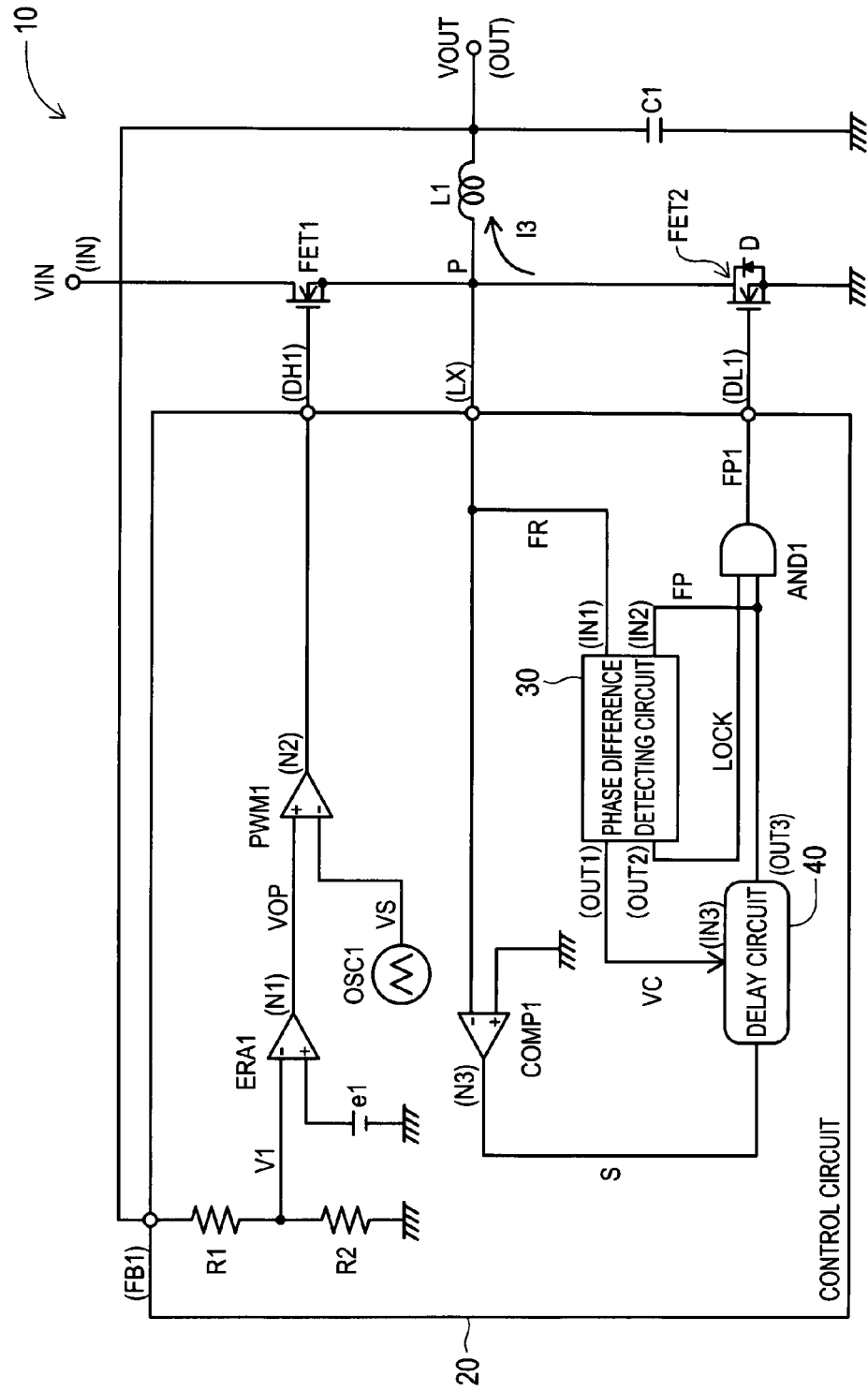
FIG. 1 is a diagram of the circuit structure of a synchronous rectification type power supply unit according to an embodiment.

The preferred embodiments will be described with reference to FIGS. 1-4. FIG. 1 is a diagram of the circuit structure of a synchronous rectification type power supply unit 10 of this embodiment. The synchronous rectification type power supply unit 10 comprises a main switching transistor FET1, a synchronous side switching transistor FET2, a chalk coil L1, a capacitor C1 and a control circuit 20. The main switching transistor FET1 corresponds to a main switch device and the synchronous side switching transistor FET2 corresponds to a rectification switch device.

The drain of the main switching transistor FET1 is connected to an input terminal (IN) so that DC input voltage VIN is applied to the drain of the main switching transistor FET1 through an input terminal (IN). The source of the main switching transistor FET1 is connected to the drain of a synchronous side switching transistor FET2. The source of the synchronous side switching transistor FET2 is connected to the ground. A diode D is connected between the drain of the synchronous side switching transistor FET2 and source of the synchronous side switching transistor FET2. The cathode of the diode D is connected to the drain of the synchronous side switching transistor FET2 and the anode of the diode D is connected to the source of the synchronous side switching transistor FET2. The diode D corresponds to an antiparallel diode.

One end of a chalk coil L1 is connected to a connecting point P between the source of the main switch transistor FET1 and the drain of the synchronous side switching transistor FET2. The other end of the chalk coil L1 is connected to an output terminal (OUT). Further, a capacitor C1 is connected between an output terminal (OUT) and ground.

A control circuit 20 corresponds to a control circuit. The control circuit 20 comprises a resistor R1, a resistor R2, an error amplifier ERA1, a PWM comparator PWM1, a triangular wave oscillator OSC1, a first comparator COMP1, a phase difference detecting circuit 30, a delay circuit 40 and a first logical AND gate circuit AND1.

In the control circuit 20, a resistor R1 and a resistor R2 are connected in series. The resistor R1 and the resistor R2 are connected between an input terminal (FB1) of the control circuit 20 and the ground. A connecting point between the resistor R1 and the resistor R2 is connected to an inverting input terminal of the error amplifier ERA1. A voltage V1 obtained by dividing voltage VOUT with the resistor R1 and resistor R2 is applied to this inverting input terminal. A reference voltage e1 is applied to a non-inverting input terminal of the error amplifier ERA1.

An output terminal (N1) of the error amplifier ERA1 is connected to a non-inverting input terminal of the PWM comparator PWM1. The triangular wave oscillator OSC1 is connected to an inverting input terminal of the PWM comparator PWM1. Further, an output terminal (N2) of the PWM comparator PWM1 is connected to a gate of a main switching transistor FET1 through an output terminal (DH1) of the control circuit 20.

An input terminal (LX) of the control circuit 20 is connected to the connecting point P described above. Further, the input terminal (LX) of the control circuit 20 is connected to an inverting input terminal of the first comparator COMP1 and a first input terminal (IN1) of the phase difference detecting circuit 30 shown in FIG. 2. The non-inverting input terminal of the first comparator COMP1 is connected to the ground. The output terminal (N3) of the first comparator COMP1 is connected to the delay circuit 40 shown in FIG. 3. An output terminal (OUT3) of the delay circuit 40 is connected to a first input of the first logical AND gate circuit AND1 and a second input terminal (IN2) of the phase difference detecting circuit 30. An output terminal (OUT2) of the phase difference detecting circuit 30 is connected to a second input of the first logical AND gate circuit AND 1 and an output of the first logical AND gate circuit AND1 is connected to a gate of the synchronous side switching transistor FET2 through an output terminal (DL1) of the control circuit 20. An output terminal (OUT1) of the phase difference detecting circuit 30 is connected to an input terminal (IN3) of the delay circuit 40.

Figure 2:
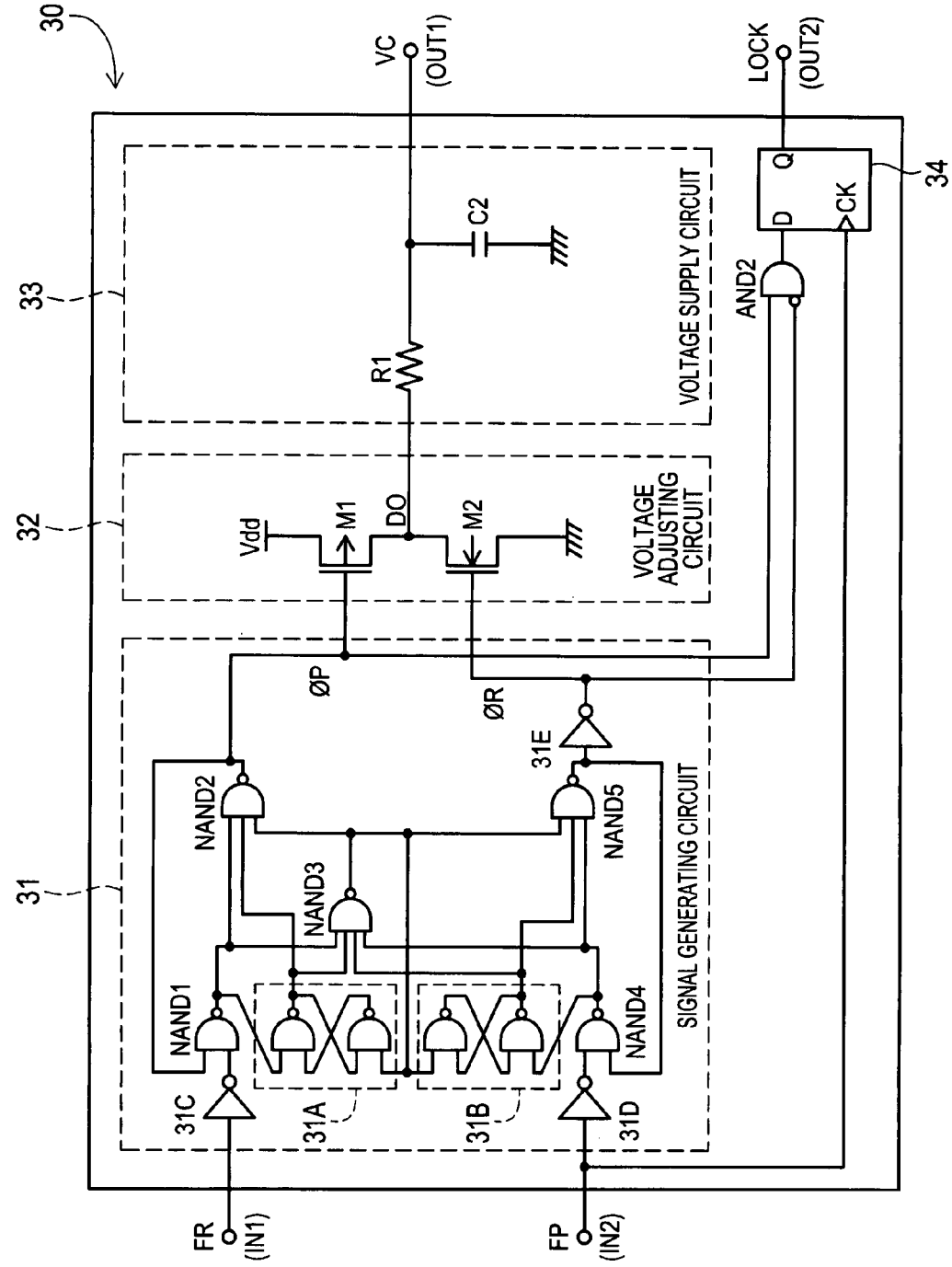
FIG. 2 is a diagram of the circuit structure of a phase difference detecting circuit.

Next, the structures of the aforementioned phase difference detecting circuit 30 and the delay circuit 40 will be described with reference to FIGS. 2, 3. As shown in FIG. 2, the phase difference detecting circuit 30 comprises a signal generating circuit 31, a voltage adjusting circuit 32, a voltage supply circuit 33, a second logical AND gate circuit 2 and a D flip-flop circuit 34.

The signal generating circuit 31 comprises a first latch circuit 31A, a second latch circuit 31B, a plurality of NAND gate circuits NAND1-NAND5, and a plurality of inverters 31C-31E. An input of the inverter 31C is connected to the first input terminal (IN1) described above. An output of the inverter 31C is connected to a first input of the NAND gate circuit NAND1 and an output of the NAND gate circuit NAND1 is connected to a first input of the first latch circuit 31A, and a first input of 3-input NAND gate circuit NAND2 and a first input of 4-input NAND gate circuit NAND3. An output of the first latch circuit 31A is connected to a second input of the 3-input NAND gate circuit NAND2 and a second input of the 4-input NAND gate circuit NAND3.

An output of the 4-input NAND gate circuit NAND3 is connected to a third input of the 3-input NAND gate circuit NAND 2 and a third input of the 3-input NAND gate circuit NAND5. Further, an output of the 4-input NAND gate circuit NAND3 is connected to a second input of the first latch circuit 31A and a second input of the second latch circuit 31B.

An output of the 3-input NAND gate circuit NAND2 is connected to a second input of the NAND gate circuit NAND1 and a gate of a PMOS transistor M1 provided in the voltage adjusting circuit 32.

An input of an inverter 31D is connected to the second input terminal (IN2) described above. An output of the inverter 31D is connected to a first input of the NAND gate circuit NAND4 and an output of the NAND gate circuit NAND4 is connected to a first input of the second latch circuit 31B and a fourth input of the 4-input NAND gate circuit NAND3 and a first input of the 3-input NAND gate circuit NAND5. An output of the second latch circuit 31B is connected to a third input of the 4-input NAND gate circuit NAND3 and a second input of the 3-input NAND gate circuit NAND5.

An output of the 3-input NAND gate circuit NAND5 is connected to an input of the inverter 31E and a second input of the NAND gate circuit NAND4, and an output of the inverter 31E is connected to a gate of an NMOS transistor M2 provided in the voltage adjusting circuit 32.

The voltage adjusting circuit 32 has the PMOS transistor M1 and the NMOS transistor M2. A source of the PMOS transistor M1 is connected to a power supply voltage Vdd. A drain of the PMOS transistor M1 is connected to a drain of the NMOS transistor M2. A source of the NMOS transistor M2 is connected to the ground. Further, the drain of the PMOS transistor M1 and the drain of the NMOS transistor M2 are connected to one end of the resistor R1 provided in the voltage supply circuit 33.

The voltage supply circuit 33 is constituted of an integration circuit and comprises a resistor R1 and a capacitor C2.

The other end of the resistor R1 is connected to an output terminal (OUT1). The capacitor C2 is connected between the output terminal (OUT1) and the ground.

A non-inverting input of the second logical AND gate circuit AND2 is connected to an output of the 3-input NAND gate circuit NAND2. An inverting input of the second logical AND gate circuit AND2 is connected to an output of the inverter 31E. An output of the second logical AND gate circuit AND2 is connected to an input terminal D of the D flip-flop circuit 34. A second input terminal (IN2) of the phase difference detecting circuit 30 is connected to a clock terminal CK of the D flip-flop circuit 34. An output terminal Q of the D-flip flop circuit 34 is connected to an output terminal (OUT2) of the phase difference detecting circuit 30.

Figure 3:
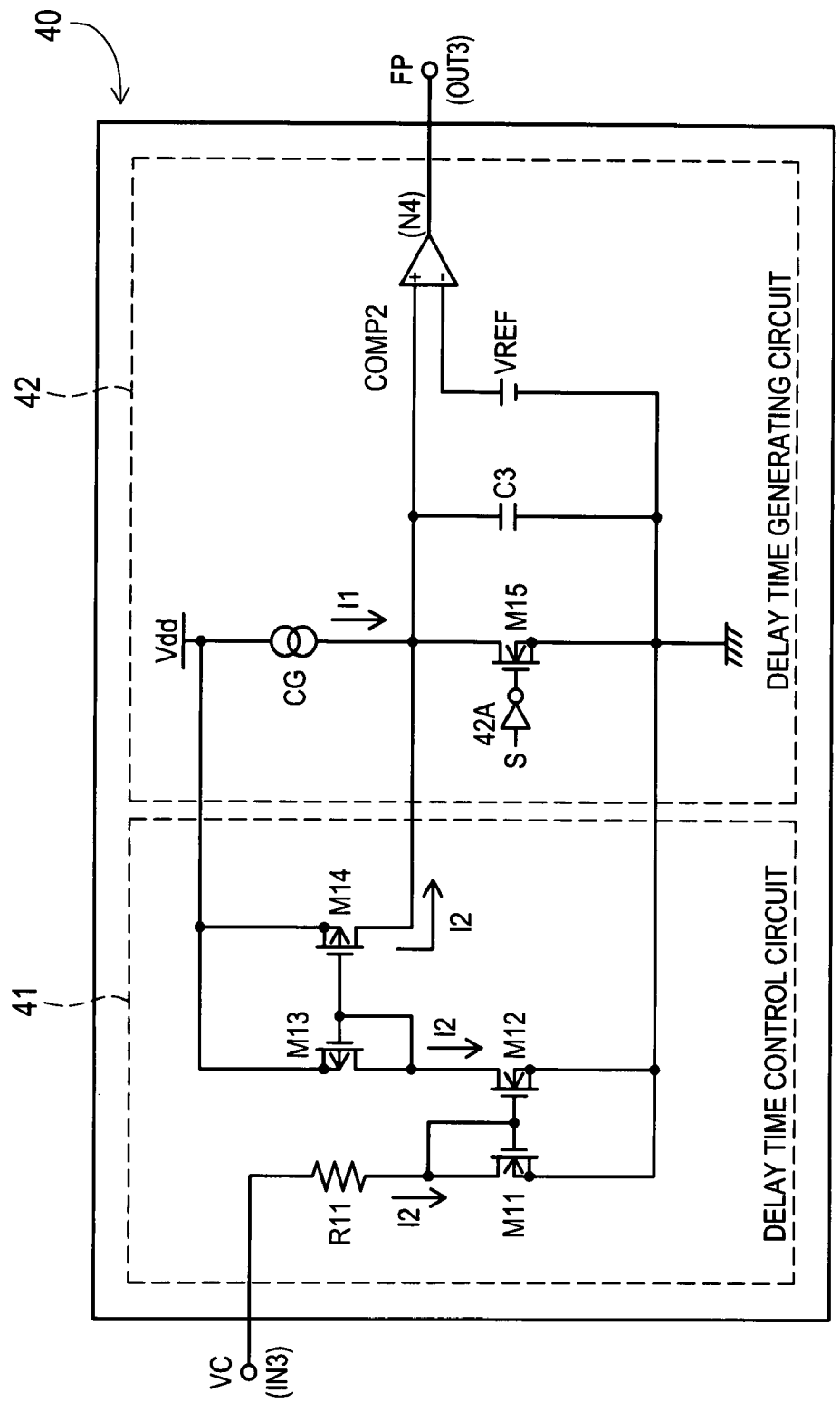
FIG. 3 is a diagram of the circuit structure of a delay circuit.

As shown in FIG. 3, the delay circuit 40 comprises a delay time control circuit 41 and a delay time generating circuit 42. The delay time control circuit 41 comprises a resistor R11, an NMOS transistor M11, an NMOS transistor M12, a PMOS transistor M13 and a PMOS transistor M14. One end of the resistor R11 is connected to an input terminal (IN3) of the delay circuit 40. The other end of the resistor R11 is connected to a drain of the NMOS transistor M11. A source of the NMOS transistor M1 is connected to the ground.

In the NMOS transistor M11, its gate and drain are short-circuited. A gate of the NMOS transistor M11 is connected to a gate of the NMOS transistor M12. The source of the NMOS transistor M12 is connected to the ground. The NMOS transistor M11 and the NMOS transistor M12 constitute a current mirror circuit.

Respective sources of the PMOS transistor M13 and PMOS transistor M14 are connected to a power supply voltage Vdd. A gate of the PMOS transistor M13 is connected to a gate of the PMOS transistor M14. In the PMOS transistor M13, its gate and drain are short-circuited. A drain of the PMOS transistor M13 is connected to a drain of the NMOS transistor M12. The NMOS transistor M13 and the NMOS transistor M14 constitute a current mirror circuit.

The delay time generating circuit 42 comprises a constant current circuit CG, an NMOS transistor M15, an inverter 42A, a capacitor C3 and a second comparator COMP2. The constant current circuit CG is connected to the power supply voltage Vdd. A drain of the NMOS transistor M15 is connected to the constant current circuit CG and a drain of the aforementioned PNOS transistor M14. A gate of the NMOS transistor M15 is connected to an output terminal (N3) of the first comparator COMP1 provided in the control circuit 20 through an inverter 42A and a source of the NMOS transistor M15 is connected to the ground.

One end of the capacitor C3 is connected to the constant current circuit CG and a drain of the PMOS transistor M14 provided in the delay time control circuit 41. A non-inverting input terminal of the second comparator COMP2 is connected to one end of the capacitor C3 and the other end of the capacitor C3 is connected to the ground. On the other hand, a reference voltage VREF is applied to an inverting input terminal of the second comparator COMP2. An output terminal (N4) of the second comparator COMP2 is connected to a first input of the first logical AND gate AND1 provided in the control circuit 20 through an output terminal (OUT3) of the delay circuit 40.

Subsequently, an operation of the synchronous rectification type power supply unit 10 of this embodiment will be described. When the synchronous rectification type power supply unit 10 shown in FIG. 1 controls the main switching transistor FET1 and the synchronous side switching transistor FET2 alternately to turn ON and OFF, it supplies the output voltage VOUT to a load circuit connected to the output terminal (OUT). The synchronous rectification type power supply unit 10 of this embodiment can control the output voltage VOUT to an objective voltage value corresponding to the DC input voltage VIN by changing the ratio (duty ratio) of ON time TON of a PWM signal to a cycle.

The relation between the DC input voltage VIN and output voltage VOUT is expressed as indicated in a following expression.

$$VOUT = \{TON/(TON+TOFF)\} \times VIN$$

where TON/(TON+TOFF): duty ratio

The error amplifier ERA1 compares the voltage V1 with the reference voltage e1 and outputs the error amplifier output voltage VOP to the PWM comparator PWM1. The error amplifier output voltage VOP is obtained by error-amplifying the voltage V1 with respect to the reference voltage e1. To use the value of the output voltage VOUT as an object voltage value, the value of the reference voltage e1 is set to the same value as the value of the voltage V1 to be applied to the inverting input terminal of the error amplifier ERA1.

The triangular wave oscillator OSC1 outputs the triangular wave signal VS to the PWM comparator PWM1.

The error amplifier output voltage VOP is inputted to a non-inverting input terminal of the PWM comparator PWM1 and the triangular wave signal VS is inputted to the inverting input terminal of the PWM comparator PWM1. The PWM comparator PWM1 compares the error amplifier output voltage VOP with the voltage value of the triangular wave signal VS.

When the error amplifier output voltage VOP is higher than the voltage value of the triangular wave signal VS, the PWM comparator PWM1 outputs a high level PWM signal from the output terminal (DH1). Contrary to this, if the error amplifier output voltage VOP is lower than the voltage value of the triangular wave signal VS, the PWM comparator PWM1 outputs a low level PWM signal from the output terminal (DH1).

If the voltage V1 is lower than the reference voltage e1, the error amplifier output voltage VOP is increased so that a period (TON) in which the PWM signal becomes high level is prolonged. As a result, the duty ratio is increased so that the output voltage VOUT is raised. Contrary to this, if the voltage V1 is higher than the reference voltage e1, the error amplifier output voltage VOP is decreased so that the period (TOFF) in which the PWM signal becomes low level is prolonged. Consequently, the duty ratio is decreased and the output voltage VOUT drops.

In the synchronous rectification type power supply unit 10 of this embodiment, a delay signal FP is generated by delaying the input signal FR of one cycle before to be inputted to the input terminal (LX) by the delay circuit 40, and the delay signal FP1 is outputted through the first logical AND gate circuit AND1. Further, in this synchronous rectification type power supply unit 10, the phase difference detecting circuit 30 compares the phase of the input signal FR with the phase of the delay signal FP and generates a control voltage VC corresponding to the phase difference between the phase of the input signal FR and the phase of the delay signal FP. The control voltage VC corresponds to the control voltage. Additionally, if the phase difference detecting circuit 30 detects that the phases of the input signal FR and the phase of the delay signal FP agree, it outputs a phase confirmation signal LOCK. The phase confirmation signal LOCK corresponds to the phase confirmation signal.

In the phase difference detecting circuit 30, as shown in FIG. 2, the input signal FR is inputted to the first input terminal (IN1) and the delay signal FP is inputted to the second input terminal (IN2). The control voltage VC is outputted from the output terminal (OUT1). The input signal FR is supplied to a first input of the NAND gate circuit NAND1 through the inverter 31C. The delay signal FP is supplied to a first input of the NAND gate circuit NAND4 through the inverter 31D.

An output of the NAND gate circuit NAND1 is supplied to a first input of the first latch circuit 31A. Further, an output of the NAND gate circuit NAND1 is supplied to a first input of the 3-input NAND gate circuit NAND2 and a first input of the 4-input NAND gate circuit NAND3. Further, an output of the first latch circuit 31A is supplied to a second input of the 3-input NAND gate circuit NAND2 and a second input of the 4-input NAND gate circuit NAND3.

An output of the NAND gate circuit NAND4 is supplied to a first input of the second latch circuit 31B. Further, an output of the NAND gate circuit NAND4 is supplied to a fourth input of the 4-input NAND gate circuit NAND3 and a first input of the 3-input NAND gate circuit NAND5. Further, an output of the second latch circuit 31B is supplied to a third input of the 4-input NAND gate circuit NAND3 and a second input of the 3-input NAND gate circuit NAND5.

An output of the 4-input NAND gate circuit NAND3 is supplied to a third input of the 3-input NAND gate circuit NAND2 and a third input of the 3-input NAND gate circuit NAND5. Further, an output of the 4-input NAND gate circuit NAND3 is supplied to a second input of the first latch circuit 31A and a second input of the second latch circuit 31B.

An output of the 3-input NAND gate circuit NAND2 is supplied to a second input of the NAND gate circuit NAND1 and a gate of the PMOS transistor M1. Further, an output of the 3-input NAND gate circuit NAND5 is supplied to the inverter 31 and a second input of the NAND gate circuit NAND4. Then, an output of the inverter 31E is supplied to a gate of the NMOS transistor M2.

Figure 4:
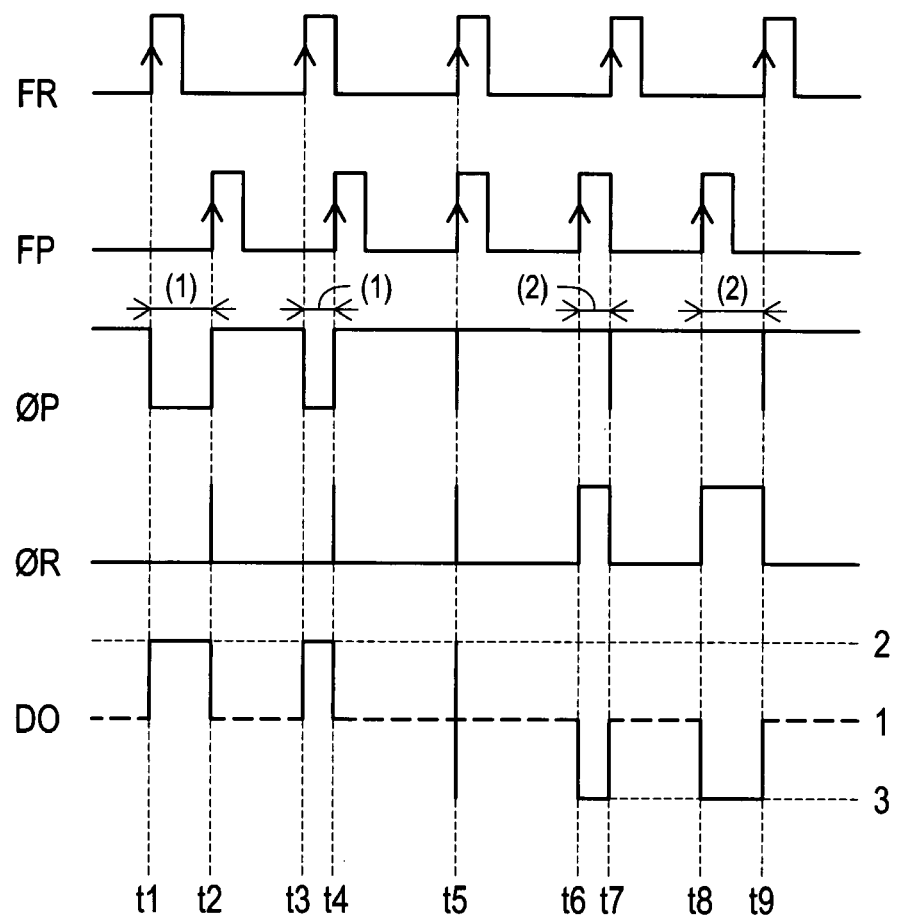
FIG. 4 is a timing chart showing an operation of the phase difference detecting circuit.
Figure 5:
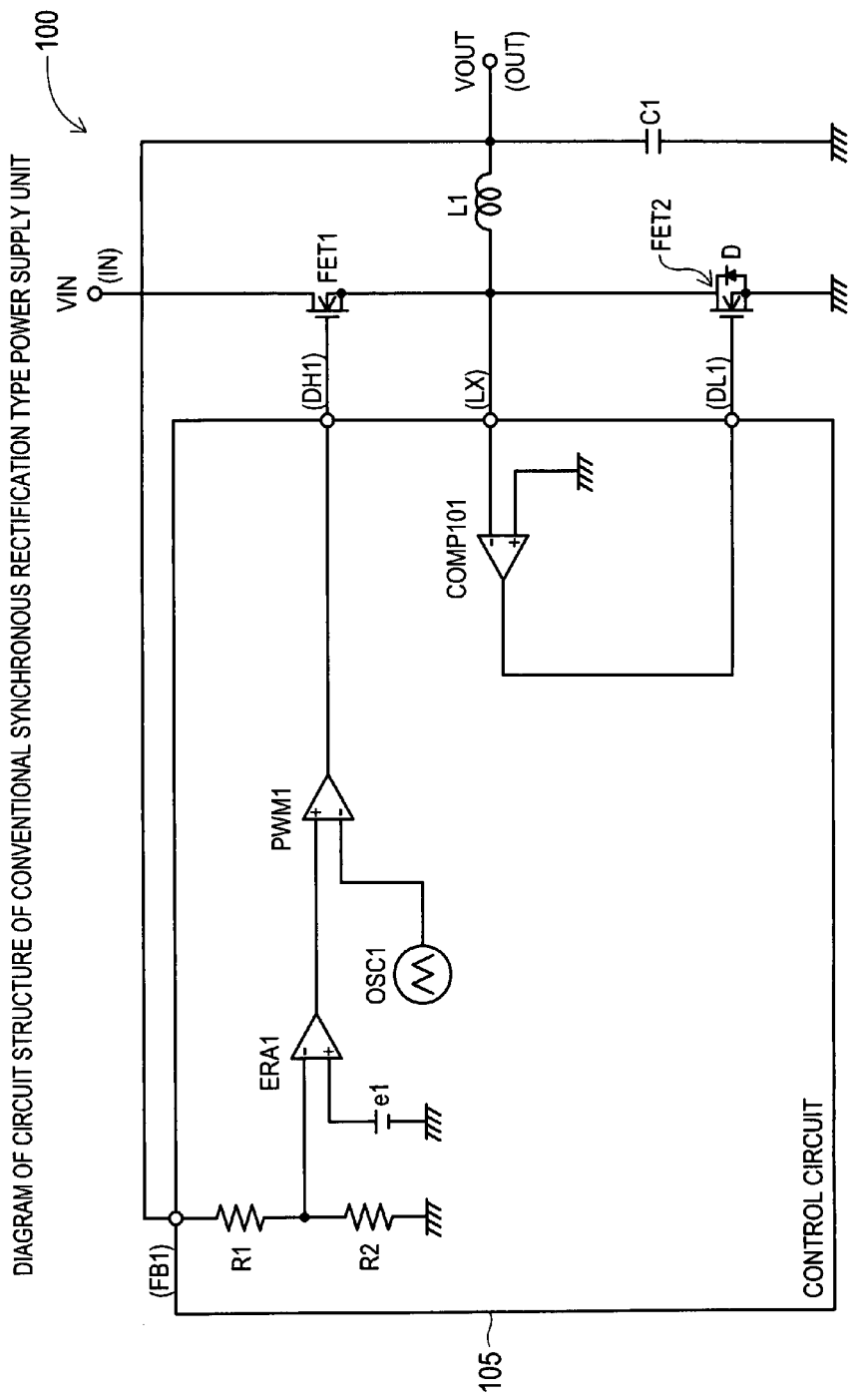
FIG. 5 is a diagram of the circuit structure of a conventional synchronous rectification type power supply unit.

FIG. 4 is a timing chart showing an operation of the phase difference detecting circuit 30. The phase difference detecting circuit 30 detects a difference between the phase of the input signal FR and the phase of the delay signal FP and performs an operation described below corresponding to the detected phase difference. The phase difference detecting circuit 30 corresponds to the phase difference detecting portion because it detects a difference between the phase of the input signal FR and the phase of the delay signal FP. Additionally, detecting of the difference between the phase of the input signal FR and the phase of the delay signal FP corresponds to the phase difference detecting step. In the meantime, (1) in FIG. 4 indicates the quantity of phase delay of the delay signal FP and (2) indicates the quantity of phase advance of the delay signal FP.

If the phase difference detecting circuit 30 detects that the phase of the delay signal FP is delayed with respect to the phase of the input signal FR, it acts as follows. The signal generating circuit 31 shown in FIG. 2 changes a signal ΦP which is an output signal of the 3-input NAND gate circuit NAND2 at a timing (t1 and t3 in FIG. 4) of a leading edge of the input signal FR to a low level and outputs the signal ΦP to a gate of the PMOS transistor M1. When the signal ΦP is at low level, the PMOS transistor M1 is turned ON and the voltage adjusting circuit 32 supplies a current to the voltage supply circuit 33. The signal DO in FIG. 4 indicates a current supplied to the voltage supply circuit 33 and when the signal DO is at level 2, it indicates that a current is supplied to the voltage supply circuit 33.

When a current is supplied to the voltage supply circuit 33, voltage on both ends of the capacitor C2 rises as time elapses so that the control voltage VC rises. As shown in FIG. 3, the control voltage VC is applied to the delay circuit 40 through the input terminal (IN3). Because if the signal ΦP continues a state of low level, the control voltage VC rises as described above so that the quantity of phase delay of the delay signal FP can be reduced as described later, the continuous state of low level signal ΦP corresponds to the adjustment state of the quantity of delay. Contrary to this, because if the signal ΦP does not continue the state of low level, the quantity of phase delay of the delay signal FP is not changed, the non-continuous state of low level signal ΦP corresponds to the non-adjustment state of the quantity of delay.

After that, the signal generating circuit 31 changes the signal ΦP to high level at the timing (t2 and t4 in FIG. 4) of a leading edge of the delay signal FP and outputs the signal ΦP to a gate of the PMOS transistor M1. When the signal ΦP is at high level, the PMOS transistor M1 is turned OFF and the voltage adjusting circuit 32 stops supply of current to the voltage supply circuit 33. When the signal DO in FIG. 4 is at level 1, it indicates a state in which no current is supplied to the voltage supply circuit 33. In the meantime, because when the phase difference detecting circuit 30 detects that the phase of the delay signal FP is delayed with respect to the phase of the input signal FR, the signal ΦP of low level is outputted from the signal generating circuit 31, the signal ΦP corresponds to the phase delay detecting signal.

If the phase difference detecting circuit 30 detects that the phase of the delay signal FP is advanced with respect to the phase of the input signal FR, it acts as follows. The signal generating circuit 31 changes the signal ΦR which is an output signal of the inverter 31E to high level at a timing (t6 and t8 in FIG. 4) of a leading edge of the delay signal FP and outputs the signal ΦR to the gate of the NMOS transistor M2. When the signal ΦR is at high level, the NMOS transistor M2 is turned ON so that the capacitor C2 is discharged and current flows to the ground through the resistor R1 and the NMOS transistor M2 of the voltage supply circuit 33. When the signal DO is at level 3, it indicates a state in which after current flows from the voltage supply circuit 33 to the voltage adjusting circuit 32, that current flows to the ground.

When the capacitor C2 is discharged and current flows to the ground, voltage at both ends of the capacitor C2 drops as time elapses so that the control voltage VC applied to the delay circuit 40 drops. Because if the signal ΦR continues the state of high level, the control voltage VC drops as described above and the quantity of phase advancement of the delay signal FP can be reduced as described later, the continuous state of high level signal ΦR corresponds to the adjustment state of the quantity of advancement. Contrary to this, because when the signal ΦR does not continue the state of high level, the quantity of phase advancement of the delay signal FP is not changed, the non-continuous state of high level signal ΦR corresponds to the non-adjustment state of the quantity of advancement.

After that, the signal generating circuit 31 changes the signal ΦR to low level at a timing (t7 and t9 in FIG. 4) of a leading edge of an input signal FR and outputs the signal ΦR to a gate of the NMOS transistor M2. When the signal ΦR is at low level, the NMOS transistor M2 is turned OFF and no current flows to the ground through the resistor R1 and NMOS transistor M2 of the voltage supply circuit 33. In the meantime, because when the phase difference detecting circuit 30 detects that the phase of the delay signal FP is advanced with respect to the phase of the input signal FR, the signal ΦR of high level is outputted from the signal generating circuit 31, the signal ΦR corresponds to the phase advancement detecting signal.

If the phase difference detecting circuit 30 detects that the phase of the delay signal FP agrees with the phase of the input signal FR, it acts as follows. At a time in which the timing of the leading edge of the input signal FR agrees with the leading timing of the delay signal FP (t5 in FIG. 4), the voltage adjusting circuit 32 does not supply current to the voltage supply circuit 33. In the meantime, because at the time t5, the signal ΦP does not continue the state of low level and the signal ΦR does not continue the state of high level, the time t5 corresponds to the non-adjustment state of the quantity of delay and the non-adjustment state of the quantity of advancement.

When the phase difference detecting circuit 30 detects that the phase of the delay signal FP agrees with the phase of the input signal FR, the D flip-flop circuit 34 acts as follows. The signal ΦP of high level is inputted to the non-inverting input of the second logical AND gate circuit AND2 and the signal ΦR of low level is inputted to the inverting input of the second logical AND gate AND2. At this time, the second logical AND gate circuit AND2 outputs a high level signal. The high level signal is inputted to the input terminal D of the D flip-flop circuit 34. In the meantime, the high level signal corresponds to the logical AND signal. In the meantime, the D flip-flop circuit 34 corresponds to the D flip-flop and the input terminal D corresponds to the input terminal of the D flip-flop.

The delay signal FP is inputted to the clock terminal CK of the D flip-flop circuit 34. The clock terminal CK corresponds to the clock input terminal of the D flip-flop. If the delay signal FP is inputted to the clock terminal CK of the D flip-flop circuit 34, the phase confirmation signal LOCK of high level is outputted from the output terminal Q.

The signal generating circuit 31 corresponds to the signal generating portion because as described above, it outputs the signal ΦP of low level when the phase of the delay signal FP is delayed with respect to the phase of the input signal FR and when the phase of the delay signal FP is advanced with respect to the phase of the input signal FR, the signal ΦR of high level is outputted. Outputting the signal ΦP of low level when the phase of the delay signal FP is delayed with respect to the phase of the input signal FR corresponds to phase delay detecting signal generating step and outputting the signal ΦR of high level when the phase of the delay signal FP is advanced with respect to the phase of the input signal FR corresponds to phase advancement detecting signal generating step.

When the signal Φ P is at low level (in the adjustment condition of the quantity of delay) and the signal ΦR is at low level (in the non-adjustment condition of the quantity of advancement), the voltage adjusting circuit 32 turns ON the PMOS transistor M1 and turns OFF the NMOS transistor M2 so as to raise the control voltage VC and when the signal ΦP is at high level (in the non-adjustment condition of the quantity of delay) and the signal ΦR is at high level (in the adjustment condition of the quantity of advancement), it turns OFF the PMOS transistor M1 and turns ON the NMOS transistor M2 so as to lower the control voltage. Thus, the voltage adjusting circuit 32 corresponds to the control voltage adjusting portion because it raises or lowers the control voltage VC corresponding to the level of the respective signals Φ P and Φ R. Raising or lowering the control voltage VC corresponding to the level of the respective signals ΦP and ΦR corresponds to the voltage adjusting step.

As described above, when the signal ΦP is at low level (in the adjustment condition of the quantity of delay) and the signal ΦR is at low level (in the non-adjustment condition of the quantity of the advancement), the voltage supply circuit 33 turns ON the PMOS transistor M1 and turns OFF the NMOS transistor M2 so as to raise the control voltage VC and apply the control voltage VC to the delay circuit 40. When the signal ΦP is at high level (in the non-adjustment condition of the quantity of delay) and the signal ΦR is at high level (in the adjustment condition of the quantity of advancement), the voltage supply circuit 33 turns OFF the PMOS transistor M1 and turns ON the NMOS transistor NMOS transistor M2 so as to lower the control voltage and apply the control voltage VC to the delay circuit 40. Therefore, the voltage supply circuit 33 corresponds to the control voltage supply portion because it raises or lowers the control voltage VC corresponding to the level of the respective signals ΦP and ΦR and applies the control voltage VC to the delay circuit 40. Further, generating the control voltage VC corresponding to the level of the respective signals ΦP and Φ R corresponds to the voltage generating step.

The delay circuit 40 acts as follows corresponding to the control voltage VC applied by the voltage supply circuit 33. In the delay time control circuit 41, a current mirror circuit is constituted of an NMOS transistor M11 and an NMOS transistor M12 and current I2 flowing into the drain of the NMOS transistor M11 is outputted from the drain of the NMOS transistor M12.

In the delay time control circuit 41, a current mirror circuit is constituted of a PMOS transistor M13 and a PMOS transistor M14 and current I2 flowing into the drain of the NMOS transistor M12 is outputted from the drain of the PMOS transistor M14.

The delay time generating circuit 42 can charge the capacitor C3 with current I1 outputted from the constant current circuit CG and current I2 outputted from the delay time control circuit 41.

As understood from FIG. 1, when the main switching transistor FET1 is turned OFF, current I3 flows from the diode D to the chalk coil L1 so that the voltage at the connecting point P becomes lower than the ground voltage. When the voltage at the connecting point P becomes lower than the ground voltage, the first comparator COMP1 outputs the comparison signal S of high level from the output terminal (N3) to the delay circuit 40. The first comparator COMP1 corresponds to the detecting portion because it detects that when the transistor FET1 is turned OFF, the voltage at the connecting point P is changed and lowered with respect to the ground voltage. Further, detecting that the voltage at the connecting point P is changed and lowered with respect to the ground voltage corresponds to the detecting step. In the meantime, the signal FR indicates a signal which shows a change in the voltage at the connecting point P and corresponds to the first signal.

As shown in FIG. 3, the signal S of high level is inputted to the gate of the NMOS transistor M15 through the inverter 42A. Consequently, a low level signal is inputted to the gate of the NMOS transistor M15 so that the NMOS transistor M15 is turned OFF.

If the NMOS transistor M15 is turned OFF, the capacitor C3 is charged with the current I1 and the current I2. Consequently, the voltage at both ends of the capacitor C3 is raised. If the voltage at both ends of the capacitor C3 becomes higher than the reference voltage VREF, the second comparator COMP2 outputs the delay signal FP of high level to a first input of the first logical AND gate circuit AND1 and a second input terminal (IN2) of the phase difference detecting circuit 30 from the output terminal (N4) through the output terminal (OUT3). Because the first comparator COMP1 compares a voltage at the connecting point P of one cycle before with the ground voltage and the comparison signal S controls the NMOS transistor M15 of the delay time generating circuit 42 to turn ON and OFF so that the delay signal FP is outputted by the second comparator COMP2 of the delay time generating circuit 42, the delay signal FP corresponds to the second signal.

The phase difference detecting circuit 30 compares the phase of the input signal FR inputted from the first input terminal (IN1) with the phase of the delay signal FP inputted from the second input terminal (IN2) as described above. If the phase difference detecting circuit 30 detects that the phase of the delay signal FP is delayed with respect to the phase of the input signal FR, it raises the control voltage VC (see FIG. 2) and increases the current I2 (see FIG. 3) flowing through the delay time control circuit 41. Consequently, a time in which voltage at both ends of the capacitor C3 becomes higher than the reference voltage VREF is shortened so as to accelerate a timing in which the delay circuit 40 outputs the delay signal FP of high level. Then, the quantity of delay of the phase of the delay signal FP shown in FIG. 4 ((1) in the Figure) is reduced and adjusted so that the phase of the delay signal FP agrees with the phase of the input signal FR.

On the other hand, when the phase difference detecting circuit 30 detects that the phase of the delay signal FP is advanced with respect to the phase of the input signal FR, as described above, it lowers the control voltage VC so as to reduce the current I2 flowing through the delay time control circuit 41. Consequently, a time in which the voltage at both ends of the capacitor C3 becomes higher than the reference voltage VREF is prolonged and a timing in which the delay circuit 40 outputs the delay signal FP of high level is delayed. Then, the quantity of the advancement of the phase of the delay signal FP ((2) in FIG. 4) is reduced and adjusted so that the phase of the delay signal FP agrees with the phase of the input signal FR.

If the phase difference detecting circuit 30 detects that the phase of the delay signal FP agrees with the phase of the input signal FR, as described above, the D flip-flop circuit 34 outputs the phase difference confirmation signal LOCK of high level to the second input of the first logical AND gate circuit AND1 and the phase difference confirmation signal LOCK of high level is inputted to the second input of the first logical AND gate AND1.

When the phase difference confirmation signal LOCK of high level is inputted to the second input of the first logical AND gate circuit AND1, the delay signal FP of high level is inputted to the first input of the first logical AND gate circuit AND1. If the phase difference confirmation signal LOCK is inputted to the second input, the first logical AND gate circuit AND1 passes the delay signal FP and outputs the delay signal FP1 to the gate of the synchronous side switching transistor FET2 through the output terminal (DL1) of the control circuit 20. Consequently, the synchronous side switching transistor FET2 is turned ON. The first logical AND gate circuit AND1 corresponds to the second signal output portion because it outputs the delay signal FP1 synchronous with the delay signal FP to the gate of the synchronous side switching transistor FET2 under a condition that the phase difference confirmation signal LOCK is inputted therein.

The phase difference detecting circuit 30 and the delay circuit 40 correspond to the phase difference adjusting portion because as described above, they reduce the quantity of the delay of phase or the advancement of phase of the delay signal FP by changing a timing for outputting the delay signal FP of high level so that the phase of the delay signal FP agrees with the phase of the input signal FR. Furthermore, the step of reducing the quantity of the delay or the advancement of the delay signal FP by changing the timing for outputting the delay signal FP of high level so that the phase of the delay signal FP agrees with the phase of the input signal FR corresponds to the phase difference adjusting step.

The delay circuit 40 corresponds to the delay portion because it changes a timing in which the second comparator COMP2 outputs the delay signal FP of high level corresponding to the applied control voltage VC as described above. Further, changing the timing in which the second comparator COMP2 outputs the delay signal FP of high level corresponding to the control voltage VC corresponds to the delay step. The capacitor C3 in FIG. 4 corresponds to the capacitor provided in the delay portion. The delay time control circuit 41 corresponds to the current supply portion because it outputs the current I2 corresponding to the control voltage VC to the capacitor C3 so as to change the voltage at both ends of the capacitor C3. The second comparator COMP2 corresponds to the voltage comparing portion because it compares the voltages at both ends of the capacitor C3 with the reference voltage VREF and outputs the delay signal FP of high level from the output terminal (N4) when the voltage at both ends of the capacitor C3 becomes higher than the reference voltage VREF.

In the synchronous rectification type power supply unit 10 and its control circuit 20 of this embodiment, the phase difference detecting circuit 30 outputs the control voltage VC to the delay circuit 40 corresponding to a phase difference between the phase of the input signal FR detected by the first comparator COMP1 and the phase of the delay signal FP obtained by delaying the input signal FR of one cycle before. After that, the delay circuit 40 increases or decreases the current I2 flowing through the delay time control circuit 41 corresponding to the applied control voltage VC so as to change a time in which the voltage at both ends of the capacitor C3 becomes higher than the reference voltage VREF in order to adjust the output timing of the delay signal FP. Consequently, the timing in which the delay circuit 40 outputs the delay signal FP to the phase difference detecting circuit 30 can be brought close to the timing in which the phase difference detecting circuit 30 detects the input signal FR, so that the delay signal FR can be converted to a signal having a small phase difference with respect to the input signal FR.

In the synchronous rectification type power supply unit 10 of this embodiment and its control circuit 20, when the synchronous side switching transistor FET2 is turned ON by the phase difference detecting circuit 30 and the delay circuit 40 corresponding to the delay signal FP1 synchronous with the delay signal FP whose output timing is adjusted, the timing of turning ON the synchronous side switching transistor FET2 can be brought close to a timing in which the phase difference detecting circuit 30 detects the input signal FR when the main switching transistor FET1 is turned OFF. Consequently, a delay of time from detection of the input signal FR to turning ON of the synchronous side switching transistor FET2 can be reduced. According to this embodiment, even if high frequency is employed as the switching frequency of both the transistors FET1 and FET2, both the transistors FET1 and FET2 can be turned ON and OFF rapidly by reducing the ratio of time delay in the switching cycle of the transistor by reducing the delay of time period from the time when the main switching transistor FET1 is turned OFF to the time when the synchronous side switching transistor FET2 is turned ON.

Further, according to the synchronous rectification type power supply unit 10 of this embodiment and its control circuit 20, if the timing in which the synchronous side switching transistor FET2 is turned ON is brought close to the timing in which the phase difference detecting circuit 30 detects the input signal FR when the main switching transistor FET1 is turned OFF, the time in which current flows to the diode D connected between the drain and source of the synchronous side switching transistor FET2 after the main switching transistor FET1 is turned OFF is shortened, so that current can be supplied to the synchronous side switching transistor FET2. Then, power loss occurred when current flows to the diode D can be reduced.

According to the control method of the synchronous rectification type power supply unit 10 of this embodiment, the control voltage VC is outputted to the delay circuit 40 corresponding to a phase difference between the phase of the input signal FR and the phase of the delay signal FP obtained by delaying the input signal FR of one cycle before. After that, according to the control method of this embodiment, the current I2 flowing through the delay time control circuit 41 is increased or decreased corresponding to the control voltage VC so as to change a time in which the voltage at both ends of the capacitor C3 becomes higher than the reference voltage VREF in order to adjust the output timing of the delay signal FP. As a consequence, the timing of outputting the delay signal FP can be brought close to the timing of detecting the input signal FR, so that the delay signal FP can be converted to a signal having a smaller phase difference with respect to the input signal FR.

According to the control method of the synchronous rectification type power supply unit of this embodiment, if the synchronous side switching transistor FET2 is turned ON corresponding to the delay signal FP1 synchronous with the delay signal FP whose output timing is adjusted, the timing in which the synchronous side switching transistor FET2 is turned ON can be brought close to the timing of detecting the input signal FR when the main switching transistor FET1 is turned OFF, so that the delay of time period from the time when the input signal FR is detected to the time when the synchronous side switching transistor FET2 is turned ON is shortened. Then, according to the control method of this embodiment, even if high frequency is employed as the switching frequency of both the transistors FET1 and FET2, the transistors FET1 and FET2 can be turned ON and OFF rapidly and the ratio of the time delay in the switching cycle of the transistor can be reduced by reducing the delay of time period from the time when the main switching transistor FET2 is turned OFF to the time when the synchronous side switching transistor FET2 is turned ON.

According to the control method of the synchronous rectification type power supply unit of this embodiment, if the timing in which the synchronous side switching transistor FET2 is turned ON is brought close to the timing of detecting the input signal FR when the main switching transistor FET1 is turned OFF, time in which current flows to the diode D connected between the drain and source of the synchronous side switching transistor FET2 after the main switching transistor FET1 is turned OFF is shortened, so that current can be supplied to the synchronous side switching transistor FET2. Then, power loss occurred when current flows to the diode D can be reduced.

In the synchronous rectification type power supply unit 10 of this embodiment and its control circuit 20, if the delay circuit 40 increases or decreases the current I2 flowing through the delay time control circuit 41 corresponding to the applied control voltage VC so as to change the timing of outputting the delay signal FP, the phase of the delay signal FP is changed so that the quantity of the delay of the phase of the delay signal FP ((1) in FIG. 4) or the quantity of the advancement of the phase of the delay signal FP ((2) in FIG. 4) is reduced and therefore, the phase difference between the phase of the delay signal FP and the phase of the input signal FR can be reduced.

Further, in the synchronous rectification type power supply unit 10 of this embodiment and its control circuit 20, if the phase difference detecting circuit 30 detects a phase difference repeatedly between the phase of the delay signal FP whose timing of being outputted from the delay circuit 40 is changed and the phase of the input signal FR, as for the detection result, the phase difference is further reduced, so that the delay circuit 40 reduces the quantity of the phase delay or the quantity of the phase advancement corresponding to the control voltage VC which is changed based on the detection result and consequently, the phase difference between the phase of the delay signal FP and the phase of the input signal FR can be kept in a state of being reduced.

According to the control method of the synchronous rectification type power supply unit 10 of this embodiment, the control voltage VC is outputted corresponding to the phase difference between the phase of the input signal FR and the phase delay signal FP which delays the input signal FR of one cycle before. Then, according to the control method of this embodiment, if the current I2 flowing through the delay time control circuit 41 is increased or decreased corresponding to the control voltage VC so as to change the timing of outputting the delay signal FP, the phase of the delay signal FP is changed and the quantity of the phase delay of the delay signal FP or the quantity of the phase advancement of the delay signal FP is reduced, and consequently, the phase difference between the phase of the delay signal FP and the phase of the input signal FR can be kept in a state of being reduced.

According to the control method of the synchronous rectification type power supply unit 10 of this embodiment, if the phase difference between the phase of the delay signal FP whose timing of being outputted from the delay circuit 40 is changed and the phase of the input signal FR is detected repeatedly, as for the detection result, the phase difference is further reduced, so that the quantity of the phase delay or the quantity of the phase advancement is reduced corresponding to the control voltage VC which is changed based on the detection result and consequently, a state of reducing the phase difference between the phase of the delay signal FP and the phase of the input signal FR can be continued.

In the synchronous rectification type power supply unit 10 of this embodiment and its control circuit 20, in order to reduce the quantity of the phase delay of the delay signal FP, and to reduce the quantity of the phase advancement of the delay signal FP by means of the voltage supply circuit 33, the control voltage VC whose value is raised, and the control voltage VC whose value is lowered is applied to the delay circuit 40, respectively. Then, as described above, the delay circuit 40 changes the output timing of the delay signal FP corresponding to the applied control voltage VC so as to reduce the quantity of the phase delay of the delay signal FP or the quantity of the phase advancement of the delay signal FP, and consequently, the phase difference between the phase of the delay signal FP and the phase of the input signal FR can be reduced.

In the control method of the synchronous rectification type power supply unit 10 of this embodiment, in order to reduce the quantity of the phase delay of the delay signal FP, to reduce the quantity of the phase advancement of the delay signal FP, the control voltage VC whose value is raised, or the control voltage whose value is lowered is generated, respectively. According to the control method of this embodiment, the phase difference between the phase of the delay signal FP and the phase of the input signal FR can be reduced by reducing the quantity of the phase delay of the delay signal FP or the quantity of the phase advancement of the delay signal FP by changing the output timing of the delay signal FP corresponding to the generated control voltage VC.

In the synchronous rectification type power supply unit 10 of this embodiment and its control circuit 20, if the phase of the input signal FR detected by the phase difference detecting circuit 30 when the main switching transistor FET1 is turned OFF agrees with the phase of the delay signal FP synchronous with the delay signal FP1 which turns ON the synchronous side switching transistor FET2, the first logical AND gate circuit AND1 passes the delay signal FP and outputs the delay signal FP1 to the gate of the synchronous side switching transistor FET2. Then, according to this embodiment, when the main switching transistor FET1 is turned OFF, the delay signal FP1 is outputted to the gate of the synchronous side switching transistor FET2 so as to turn the transistor FET2 ON, and consequently, both the transistors FET1 and FET2 can be prevented from being turned ON at the same time.

According to the control method of the synchronous rectification type power supply unit 10 of this embodiment, when the phase of the input signal FR detected when the main switching transistor FET1 is turned OFF agrees with the phase of the delay signal FP synchronous with the delay signal FP1 which turns the synchronous side switching transistor FET2 to ON, the delay signal FP1 is outputted to the gate of the synchronous side switching transistor FET2. Then, when the main switching transistor FET1 is turned OFF, the delay signal FP1 is outputted to the gate of the synchronous side switching transistor FET2 so as to turn the transistor FET2 ON, thereby preventing both the transistors FET1 and FET2 from being turned ON.

In the synchronous rectification type power supply unit 10 of this embodiment and its control circuit 20, when the delay time control circuit 41 outputs the current I2 which is increased or decreased corresponding to the control voltage VC to the capacitor C3, the charging time of the capacitor C3 can be adjusted corresponding to a difference of the current value outputted to the capacitor C3. Then, according to this embodiment, time in which the voltage at both ends of the capacitor C3 is raised is changed by adjusting the charging time of the capacitor C3 and the timing in which the second comparator COMP2 outputs the delay signal FP of high level is adjusted corresponding to the time in which the voltage is raised and consequently, the delay time of the delay signal FP can be changed corresponding to the timing in which the delay signal FP is outputted.

In the synchronous rectification type power supply unit 10 of this embodiment and its control circuit 20, the high level signal outputted by the second logical AND gate circuit AND2 is inputted to the input terminal D of the D flip-flop circuit 34 at a time (t5 in FIG. 4) in which the timing of the leading edge of the input signal FR agrees with the leading timing of the delay signal FP. Then, when the delay signal FP is inputted to the clock terminal CK, the D flip-flop circuit 34 outputs the phase confirmation signal LOCK of high level from the output terminal Q. Then, according to this embodiment, when the timing of the leading edge of the input signal FR agrees with the timing of the leading edge of the delay signal FP so that there is no phase difference between the phase of the input signal FR and the phase of the delay signal FP and the quantity of the phase delay of the delay signal FP or the quantity of the phase advancement of the delay signal FP does not need to be adjusted, the D flip-flop circuit 34 can output the phase confirmation signal LOCK synchronously with the delay signal FP.

In the control method of the synchronous rectification type power supply unit 10 of this embodiment, if the phase confirmation signal LOCK is outputted synchronously with the delay signal FP at the time in which the timing of the leading edge of the input signal FR agrees with the timing of the leading edge of the delay signal FP, the phase confirmation signal LOCK can be outputted synchronously with the delay signal FP when there is no phase difference between the phase of the input signal FR and the phase of the delay signal FP so that the quantity of the phase delay of the delay signal FP or the quantity of the phase advancement of the delay signal FP does not need to be adjusted.

The present invention is not restricted to the above-described embodiments but may be carried out by modifying part of the structure appropriately within a range not departing from the spirit of the invention. The control circuit 20 of the synchronous rectification type power supply unit 10 of the above embodiment may be constituted of a single semiconductor chip or a plurality of the semiconductor chips. Further, the synchronous rectification type power supply 10 may be constituted of a single semiconductor chip or a plurality of the semiconductor chips. Further, the electronic device may be constituted of a synchronous rectification type power supply unit having the control circuit.

According to the control circuit of the synchronous rectification type power supply unit, the synchronous rectification type power supply and its control method of the embodiment, if the output timing of the second signal is adjusted corresponding to the phase difference between the phase of the first signal and the phase of the second signal generated based on the first signal of one cycle before, the output timing of the second signal can be brought close to the detection timing of the first signal and the second signal can be converted to a signal having a smaller phase difference with respect to the first signal.

Further according to the embodiment, when the rectification switch device is turned ON corresponding to the second signal whose output timing is adjusted, if the timing in which the rectification switch device is turned ON can be brought close to the detection timing of the first signal originating from a state that the main switch device is OFF and thus, the delay of time period from the time when the first signal is detected to the time when the rectification switch device is turned ON can be reduced. Then, according to the embodiment, even if the switching frequency is converted to a higher frequency, the ratio of the time delay in the switching period is reduced by reducing the delay of the time from when the main switch device is turned OFF to when the rectification switching device is turned ON, and consequently, the main switch device and the rectification switch device can be turned ON and OFF rapidly.

Further, according to the embodiment, as described above, if the timing in which the rectification switch device is turned ON is brought close to the detection timing of the first signal originating from a state that the main switch device is OFF, time in which current flows to an antiparallel diode of the rectification switch device can be shortened so that current can be supplied to the rectification switch device. Thus, power loss occurred when current flows to the antiparallel diode can be reduced.

What is claimed is:

1. A control circuit of a synchronous rectification type power supply unit, the control circuit comprising:
   a detecting portion detecting a status transition of a first signal at a connecting point, the status transition changing in each of constant cycles corresponding to current flowing through an antiparallel diode when a main switch device is turned OFF, the connecting point coupling to a coil and being between the main switch device and a rectification switch device having the antiparallel diode wherein the main switch device and the rectification switch device are turned ON and OFF alternately in the constant cycles; and a phase difference adjusting portion adjusting a phase difference by adjusting output timing of a second signal which is a delayed signal of the first signal outputted one cycle before, corresponding to the phase difference between a phase of the first signal detected by the detecting portion and a phase of the second signal, wherein the rectification switch device is turned ON corresponding to the second signal whose output timing is adjusted by the phase difference adjusting portion.

2. The control circuit of the synchronous rectification type power supply unit according to claim 1 wherein the phase difference adjusting portion comprises a phase difference detecting portion detecting a phase difference between the phase of the first signal and the phase of the second signal repeatedly and a delaying portion which outputs the second signal by changing a delay time that delays the first signal of one cycle before corresponding to a detection result of the phase difference detecting portion.

3. The control circuit of the synchronous rectification type power supply according to claim 2 wherein
the phase difference detecting portion comprises:
a signal generating portion generating a phase delay detection signal changing from a non-adjustment condition of a quantity of delay in which a quantity of phase delay of the second signal is not adjusted to an adjustment condition of the quantity of the delay in which the quantity of the phase delay is reduced, under a condition of detecting that the phase of the second signal is delayed with respect to the phase of the first signal, and which generates a phase advancement detection signal which changes from a non-adjustment condition of a quantity of advancement in which a quantity of phase advancement of the second signal is not adjusted to an adjustment condition of the quantity of advancement in which the quantity of the phase advancement is reduced under a condition of detecting that the phase of the second signal is advanced with respect to the phase of the first signal;
a control voltage supplying portion generating a control voltage corresponding to the adjustment condition of the quantity of the delay or the adjustment condition of the quantity of the advancement and supplies the control voltage to the delaying portion; and
a control voltage adjusting portion instructing the adjustment condition of the quantity of the delay or the adjustment condition of the quantity of the advancement selectively to the control voltage supply portion and changing the control voltage.

4. The control circuit of the synchronous rectification type power supply unit according to claim 3 wherein the phase difference detecting portion comprises a second signal output portion outputting a phase confirmation signal determining that the phase of the first signal agrees with the phase of the second signal when the phase delay detection signal is in the non-adjustment condition of the quantity of the delay and the phase advancement detection signal is in the non-adjustment condition of the quantity of the advancement and outputs the second signal to the rectification switch device under a condition that the phase confirmation signal is inputted.

5. The control circuit of the synchronous rectification type power supply unit according to claim 3 wherein the delaying portion comprises a capacitor, a current supplying portion supplying current to the capacitor corresponding to the control voltage and changing output voltage of the capacitor and a voltage comparing portion comparing the output voltage with a reference voltage and outputs the second signal.

6. The control circuit of the synchronous rectification type power supply unit according to claim 4 wherein the phase difference detecting portion includes a D flip-flop having an input terminal in which a logical AND signal of the phase delay detection signal and the phase advancement detection signal is inputted when the phase delay detection signal is in the non-adjustment condition of the quantity of the delay and the phase advancement detection signal is in the non-adjustment condition of the quantity of the advancement, and a clock input terminal in which the second signal is inputted,
wherein the D flip-flop outputs the phase confirmation signal synchronously with the second signal.

7. A synchronous rectification type power supply unit, comprising:
a coil being coupled to a connecting point between a main switch device and a rectification switch device having an antiparallel diode wherein the main switch device and the rectification switch device are turned ON and OFF alternately in constant cycles;
a detecting portion detecting a status transition of a first signal at the connecting point, the status transition changing in each of the constant cycles corresponding to current flowing through the antiparallel diode when the main switch device is turned OFF; and
a phase difference adjusting portion adjusting a phase difference by adjusting output timing of a second signal which is a delayed signal of the first signal outputted one cycle before, corresponding to the phase difference between a phase of the first signal detected by the detecting portion and a phase of the second signal,
wherein the rectification switch device is turned ON corresponding to the second signal whose output timing is adjusted by the phase difference adjusting portion.

8. The synchronous rectification type power supply unit according to claim 7 wherein the phase difference adjusting portion comprises a phase difference detecting portion detecting a phase difference between the phase of the first signal and the phase of the second signal repeatedly and a delaying portion outputting the second signal by changing a delay time that delays the first signal of one cycle before corresponding to a detection result of the phase difference detecting portion.

9. The synchronous rectification type power supply according to claim 8,
the phase difference detecting portion further comprising:
a signal generating portion generating a phase delay detection signal changing from a non-adjustment condition of a quantity of delay in which a quantity of phase delay of the second signal is not adjusted to an adjustment condition of the quantity of the delay in which the quantity of the phase delay is reduced, under a condition of detecting that the phase of the second signal is delayed with respect to the phase of the first signal, and generating a phase advancement detection signal changing from a non-adjustment condition of a quantity of advancement in which a quantity of phase advancement of the second signal is not adjusted to an adjustment condition of the quantity of advancement in which the quantity of the phase advancement is reduced under a condition of detecting that the phase of the second signal is advanced with respect to the phase of the first signal;

a control voltage supplying portion generating a control voltage corresponding to the adjustment condition of the quantity of the delay or the adjustment condition of the quantity of the advancement and supplies the control voltage to the delaying portion; and a control voltage adjusting portion instructing the adjustment condition of the quantity of the delay or the adjustment condition of the quantity of the advancement selectively to the control voltage supply portion, and changing the control voltage.

10. The synchronous rectification type power supply unit according to claim 9, the phase difference detecting portion further comprising a second signal output portion outputting a phase confirmation signal determining that the phase of the first signal agrees with the phase of the second signal when the phase delay detection signal is in the non-adjustment condition of the quantity of the delay and the phase advancement detection signal is in the non-adjustment condition of the quantity of the advancement and outputs the second signal to the rectification switch device under a condition that the phase confirmation signal is inputted.

11. The synchronous rectification type power supply unit according to claim 9, the delaying portion further comprising a capacitor, a current supplying portion supplying current to the capacitor corresponding to the control voltage and changing output voltage of the capacitor and a voltage comparing portion comparing the output voltage with a reference voltage and outputs the second signal.

12. The synchronous rectification type power supply unit according to claim 10 wherein the phase difference detecting portion includes a D flip-flop having an input terminal in which a logical AND signal of the phase delay detection signal and the phase advancement detection signal is inputted when the phase delay detection signal is in the non-adjustment condition of the quantity of the delay and the phase advancement detection signal is in the non-adjustment condition of the quantity of the advancement, and a clock input terminal in which the second signal is inputted, wherein the D flip-flop outputs the phase confirmation signal synchronously with the second signal.

13. A control method of a synchronous rectification type power supply unit, comprising:

turning ON and OFF a main switch device and a rectification switch device alternately in constant cycles;

detecting a status transition of a first signal at a connecting point, the status transition changing in each of the constant cycles corresponding to current flowing through an antiparallel diode when the main switch device is turned OFF; and adjusting a phase difference by adjusting output timing of a second signal which is a delayed signal of the first signal outputted one cycle before, corresponding to the phase difference between a phase of the first signal detected and a phase of the second signal, wherein the rectification switch device is turned ON corresponding to the second signal whose output timing is adjusted by the adjusting the phase difference.

14. The control method of the synchronous rectification type power supply unit according to claim 13 wherein the adjusting the phase difference comprises detecting a phase difference between the phase of the first signal and the phase of the second signal repeatedly and outputting the second signal by changing a delay time that delays the first signal of one cycle before corresponding to a detection result of the detecting the phase difference.

15. The control method of the synchronous rectification type power supply according to claim 14 wherein the detecting the phase difference comprises:

generating a phase delay detection signal changing from a non-adjustment condition of a quantity of delay in which a quantity of phase delay of the second signal is not adjusted to an adjustment condition of the quantity of the delay in which the quantity of the phase delay is reduced, under a condition of detecting that the phase of the second signal is delayed with respect to the phase of the first signal;

generating a phase advancement detection signal changing from a non-adjustment condition of a quantity of advancement in which a quantity of phase advancement of the second signal is not adjusted to an adjustment condition of the quantity of advancement in which the quantity of the phase advancement is reduced under a condition of detecting that the phase of the second signal is advanced with respect to the phase of the first signal;

generating a control voltage corresponding to the adjustment condition of the quantity of the delay or the adjustment condition of the quantity of the advancement; and instructing the adjustment condition of the quantity of the delay or the adjustment condition of the quantity of the advancement selectively to change the control voltage generated by the generating the voltage.

16. The control method of the synchronous rectification type power supply unit according to claim 15 wherein the detecting phase difference comprises outputting a phase confirmation signal determining that the phase of the first signal agrees with the phase of the second signal when the phase delay detection signal is in the non-adjustment condition of the quantity of the delay and the phase advancement detection signal is in the non-adjustment condition of the quantity of the advancement, and outputting the second signal to the rectification switch device under a condition that the phase confirmation signal is inputted.

17. The control method of the synchronous rectification type power supply unit according to claim 16 wherein the detecting the phase difference includes outputting the phase confirmation signal synchronously with the second signal when the phase delay detection signal is in the non-adjustment condition of the quantity of the delay and the phase advancement detection signal is in the non-adjustment condition of the quantity of the advancement.

* * * * *